United States Patent
Nomura et al.

(10) Patent No.: US 8,593,997 B2
(45) Date of Patent: Nov. 26, 2013

(54) FULL DUPLEX/HALF DUPLEX MISMATCH DETECTING METHOD AND FULL DUPLEX/HALF DUPLEX MISMATCH DETECTING APPARATUS APPLICABLE WITH THE METHOD

(75) Inventors: Yuji Nomura, Kawasaki (JP); Takeshi Yasuie, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1031 days.

(21) Appl. No.: 11/257,748

(22) Filed: Oct. 25, 2005

(65) Prior Publication Data

US 2006/0280133 A1    Dec. 14, 2006

(30) Foreign Application Priority Data

Jun. 9, 2005 (JP) .................................. 2005-169008

(51) Int. Cl.
   *H04B 1/56* (2006.01)
   *H04L 5/14* (2006.01)
(52) U.S. Cl.
   USPC ........... 370/276; 370/248; 370/242; 370/282; 370/296; 370/241; 370/449; 370/225; 370/389
(58) Field of Classification Search
   USPC ......... 370/276, 248, 242, 282, 296, 278, 449, 370/216, 241, 225, 389; 714/715; 709/238
   See application file for complete search history.

(56) References Cited

U.S. PATENT DOCUMENTS

| | | | | |
|---|---|---|---|---|
| 6,044,480 A * | 3/2000 | Keen | .............................. | 714/715 |
| 6,101,167 A * | 8/2000 | Shimada | ....................... | 370/225 |
| 6,799,220 B1 * | 9/2004 | Merritt et al. | ................. | 709/238 |
| 6,938,086 B1 * | 8/2005 | Banga | ........................... | 709/227 |
| 2002/0009080 A1 * | 1/2002 | Engstrand et al. | ............ | 370/389 |
| 2006/0140128 A1 * | 6/2006 | Chi et al. | ....................... | 370/241 |
| 2006/0221843 A1 * | 10/2006 | Cidon et al. | .................. | 370/248 |

FOREIGN PATENT DOCUMENTS

JP    2002-185486    6/2002

OTHER PUBLICATIONS

Stanislav Shalunov et al. Detecting Duplex Mismatch on Ethernet.

* cited by examiner

*Primary Examiner* — Andrew Chriss
*Assistant Examiner* — Jamal Javaid
(74) *Attorney, Agent, or Firm* — Katten Muchin Rosenman LLP

(57) ABSTRACT

A full duplex/half duplex mismatch is detected by a full duplex/half duplex mismatch detecting apparatus connected through a network to a host. The loss rate of the transmission of a check messages is compared according to a sequential transmission pattern and the loss rate of the transmission of the check message according to divided transmission patterns by the full duplex/half duplex mismatch detecting apparatus, and if the loss rate of the transmission of the check messages according to the sequential transmission pattern is the larger, a full duplex/half duplex mismatch is determined to be present on the network path.

13 Claims, 9 Drawing Sheets

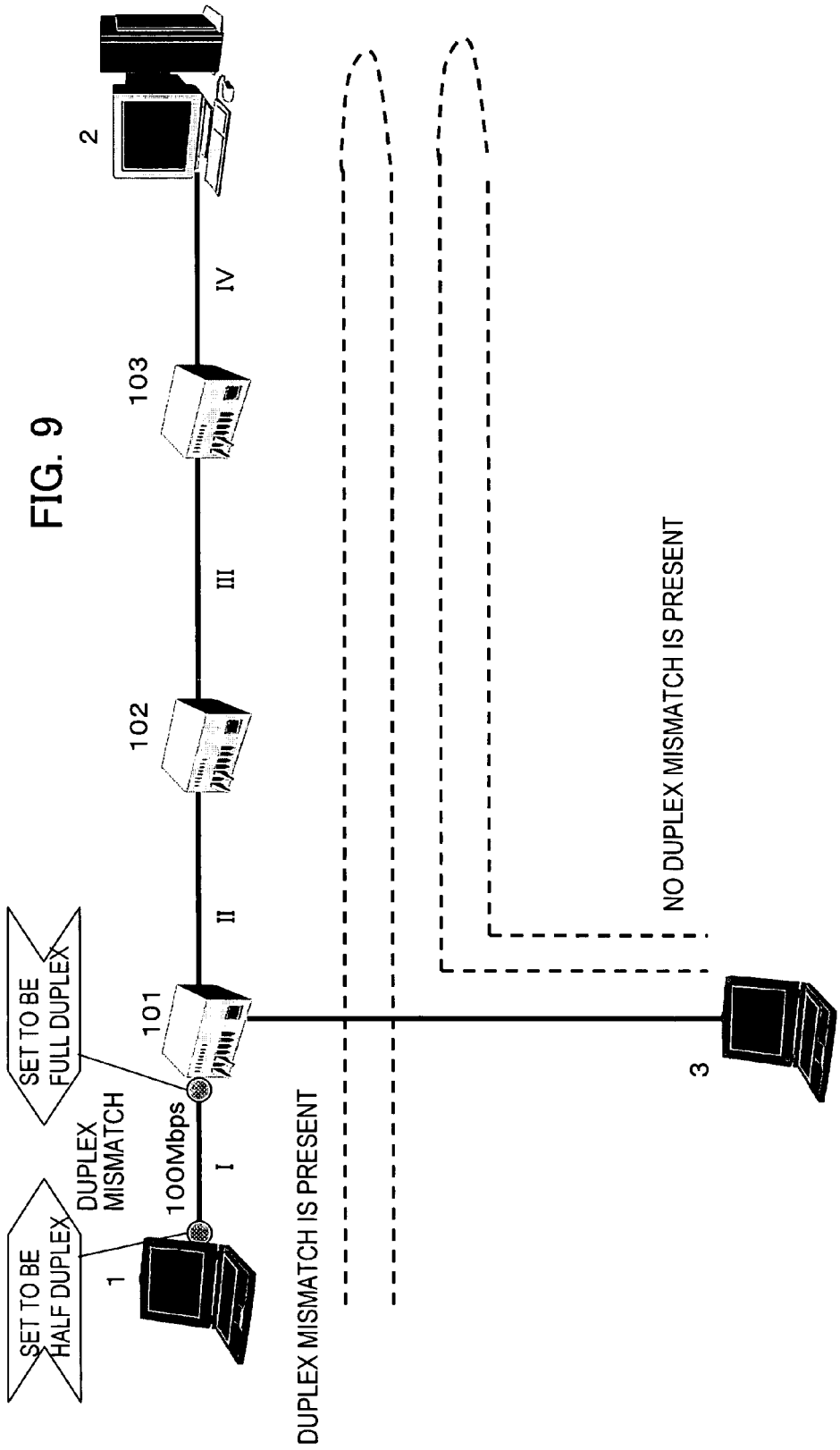

FULL DUPLEX/HALF DUPLEX MISMATCH DETECTING METHOD AND FULL DUPLEX/HALF DUPLEX MISMATCH DETECTING APPARATUS APPLICABLE WITH THE METHOD

CROSS-REFERENCE TO RELATED APPLICATIONS

This application is based upon and claims the benefit of priority from the prior Japanese Patent Application No. 2005-169008, filed on Jun. 9, 2005, the entire contents of which are incorporated herein by reference.

BACKGROUND OF THE INVENTION

1. Field of the Invention

The present invention relates to a method of detecting remotely full duplex/half duplex mismatches in an Ether network. More specifically, the method enables detecting remotely the presence of a duplex mismatch between a full duplex/half duplex mismatch detecting apparatus and a host (a network apparatus such as a personal computer, a router or a switch) to be checked, by connecting the detecting apparatus to a network. The invention relates to a full duplex/half duplex mismatch detecting method and a full duplex/half duplex mismatch detecting apparatus applicable with the method.

2. Description of the Related Art

A full duplex/half duplex mismatch (duplex mismatch) occurs when an automatic negotiation has failed between apparatuses using an Ether network. Then, packets passing through the line on which the mismatch has occurred are destroyed and this causes packet loss consequently. Though the communication on the line is possible even when a mismatch has occurred on the line, the mismatch seriously influences the performance of applications such as HTTP (Hyper Text Transfer Protocol) and FTP (File Transfer Protocol) that handle a large amount of traffic because the performance is significantly degraded due to intermittent packet loss.

Using a "ping command" is common as a method of detecting packet loss in an IP network. However, in principle, the ping command alone can not cause the loss to occur even when a duplex mismatch has occurred and, therefore, the duplex mismatch has not been able to be detected consequently using the ping command.

Therefore, at present, when loss has occurred in communications on a protocol such as UDP (User Datagram Protocol) and TCP (Transmission Control Protocol), it is common to check duplex mismatches by inspecting the mode of the duplex (whether full duplex or half duplex) of the interfaces of all of such apparatuses on the communication path as routers, switches and hosts.

Furthermore, as a conventional technique, it is known that a server that can download to clients an application that detects duplex mismatches is installed in a network and, by analyzing the TCP sequence between a server and a client and detecting that the loss rates are asymmetric between the uplink line and the downlink line when a duplex mismatch has occurred because the TCP traffics are asymmetric between the uplink line and the downlink line, the duplex mismatch is discovered. (See, for example, "Detecting Duplex Mismatch on Ethernet", http://www.pan2005.org/PDF/34310138.pdf)

However, in the above conventional method of checking a duplex mismatch by inspecting the mode of the duplex (whether full duplex or half duplex) of the interfaces of all of such apparatuses on the communication path as routers, switches and hosts, the following preconditions need to be cleared in order to inspect the interface status of those apparatuses.

1) The connection topology among the network apparatuses is known.
2) Means for checking the mode of duplex of the network apparatuses is possessed as knowledge.
3) A human can move to a place where the human can check the duplex mode.

In addition to the above, the status of the mode of duplex needs to be actually checked manually for each of the network apparatuses and this results in a problem that the cost becomes high in terms of personnel and time.

Furthermore, in the technique described in the above reference, the case where loss has occurred from the asymmetry between the uplink line and the downlink line without any duplex mismatch and the case where a duplex mismatch has actually occurred, can not be distinguished from each other and a duplex mismatch may be determined mistakenly. Furthermore, because the technique employs a system for which a server needs to be prepared, all clients need to access the server and a hundred clients, for example, has to be operated in order to check those hundred clients. Therefore, the technique has a problem of higher cost for checking.

SUMMARY OF THE INVENTION

It is therefore an object to provide a full duplex/half duplex mismatch detecting method that can remotely discover the presence of a duplex mismatch between a duplex detecting apparatus and a host to be checked (which is a network apparatus such as a PC, a router or a switch) using the duplex detecting apparatus in order to solve the problems in the above conventional technique, and a full duplex/half duplex mismatch detecting apparatus applicable with the method.

In addition, the cause of packet loss is various. Hence, another object of the present invention is to provide a full duplex/half duplex mismatch detecting method that enables determination, with high precision, of packet loss caused by a duplex mismatch, and a full duplex/half duplex mismatch detecting apparatus applicable with the method.

In order to achieve the above objects, according to a first aspect of the present invention there is provided a method of detecting a full duplex/half duplex mismatch by a full duplex/half duplex mismatch detecting apparatus connected through a network to a host, the method comprising the steps of sequentially transmitting a plurality of check messages at short intervals as a sequential transmission pattern from the full duplex/half duplex mismatch detecting apparatus; dividing one (1) check message into a plurality of communication frames and transmitting them as a divided transmission pattern; returning the check messages transmitted according to the sequential transmission pattern by transmitting the check messages as they are from the host side; reassembling and returning the check message transmitted according to the divided transmission pattern by transmitting the check message from the host side; comparing the loss rate of the transmission of the check messages according to the sequential transmission pattern and the loss rate of the transmission of the check message according to the divided transmission pattern by the full duplex/half duplex mismatch detecting apparatus; and if the loss rate of the transmission of the check messages according to the sequential transmission pattern is the larger, determining a full duplex/half duplex mismatch to be present on the network path.

In order to attain the above objects, according to a second aspect of the present invention there is provided a full duplex/half duplex mismatch detecting apparatus connected through a network to a host, comprising a check packet transmitting unit for transmitting a plurality of check messages sequentially at short intervals as a sequential transmission pattern, and dividing one (1) check message into a plurality of communication frames and transmitting the frames as a divided transmission pattern; a host for returning the check messages transmitted according to the sequential transmission pattern by transmitting the check messages as they are from the host side, and reassembling and returning the check message transmitted according to the divided transmission pattern by transmitting the check message from the host side; and a detecting unit for comparing the loss rate of the transmission of the check messages according to the sequential transmission pattern and the loss rate of the transmission of the check message according to the divided transmission pattern and, determining a full duplex/half duplex mismatch to be present on the network path when the loss rate of the transmission of the check messages according to the sequential transmission pattern is the larger.

The method of the present invention may further comprise the steps of transmitting the frames of the check message according to the divided transmission pattern at short intervals as a sequential divided transmission pattern; reassembling and returning the message transmitted according to the sequential divided transmission pattern by transmitting the check message from the host side; and determining by the full duplex/half duplex mismatch detecting apparatus that the number of the check messages received is smaller than the number of the check messages transmitted according to the sequential divided transmission pattern and that the number of the check messages transmitted and the number of the check messages received according to the divided transmission pattern are approximately equal and, thereby, detecting a full duplex/half duplex mismatch to be present on the network path between the detecting apparatus and the receiving side.

Transmission of check packets according to the sequential transmission pattern and the divided transmission pattern may be repeated for a plurality of times. Transmission of check packets according to the divided sequential transmission pattern may be repeated for a plurality of times. The time period during which or the time at which the check packets are transmitted may be controlled such that the load on the network does not exceed a predetermined level. The time period during which or the time at which the check packets are transmitted may be controlled such that the load on the network does not exceed a predetermined level.

The round-trip delay time between the full duplex/half duplex mismatch detecting apparatus and the host may be measured in advance, and the intervals for transmitting the check packets may be controlled such that each interval is equal to the measured round-trip delay time. A plurality of nodes may be present at the host and on the network between the full duplex/half duplex mismatch detecting apparatus and the host, and returning of the check messages transmitted according to the divided pattern and the sequential pattern may be performed one after another at the host and the plurality of nodes and the position of the presence of the full duplex/half duplex mismatch may be determined. The detection of the full duplex/half duplex mismatch may be performed by two (2) full duplex/half duplex mismatch detecting apparatuses connected with one (1) node among the plurality of nodes and, when presence of no full duplex/half duplex mismatch has been determined in a section shared by paths of the check messages, presence of a full duplex/half duplex mismatch may be determined on the path connecting the one node with any one (1) of the two (2) full duplex/half duplex mismatch detecting apparatuses.

The above and other features of the present invention will become more apparent from the following embodiments of the present invention, which will be described with reference to the accompanying drawings.

According to the invention, remote detection of full duplex/half duplex mismatches is enabled by applying the invention while mistaken determination of and failure in determining those mismatches can be prevented. Furthermore, by adapting a duplex checking apparatus to transmit packets, checking is completed by transmitting packets from the checking apparatus even when a considerable number of, for example, a hundred clients are checked. Therefore, the cost can be lowered.

BRIEF DESCRIPTION OF THE DRAWINGS

FIG. 9 is an explanatory view of an example for the case where a plurality of duplex detecting apparatuses are used for detection.

DESCRIPTION OF THE PREFERRED EMBODIMENTS

Figure 1:
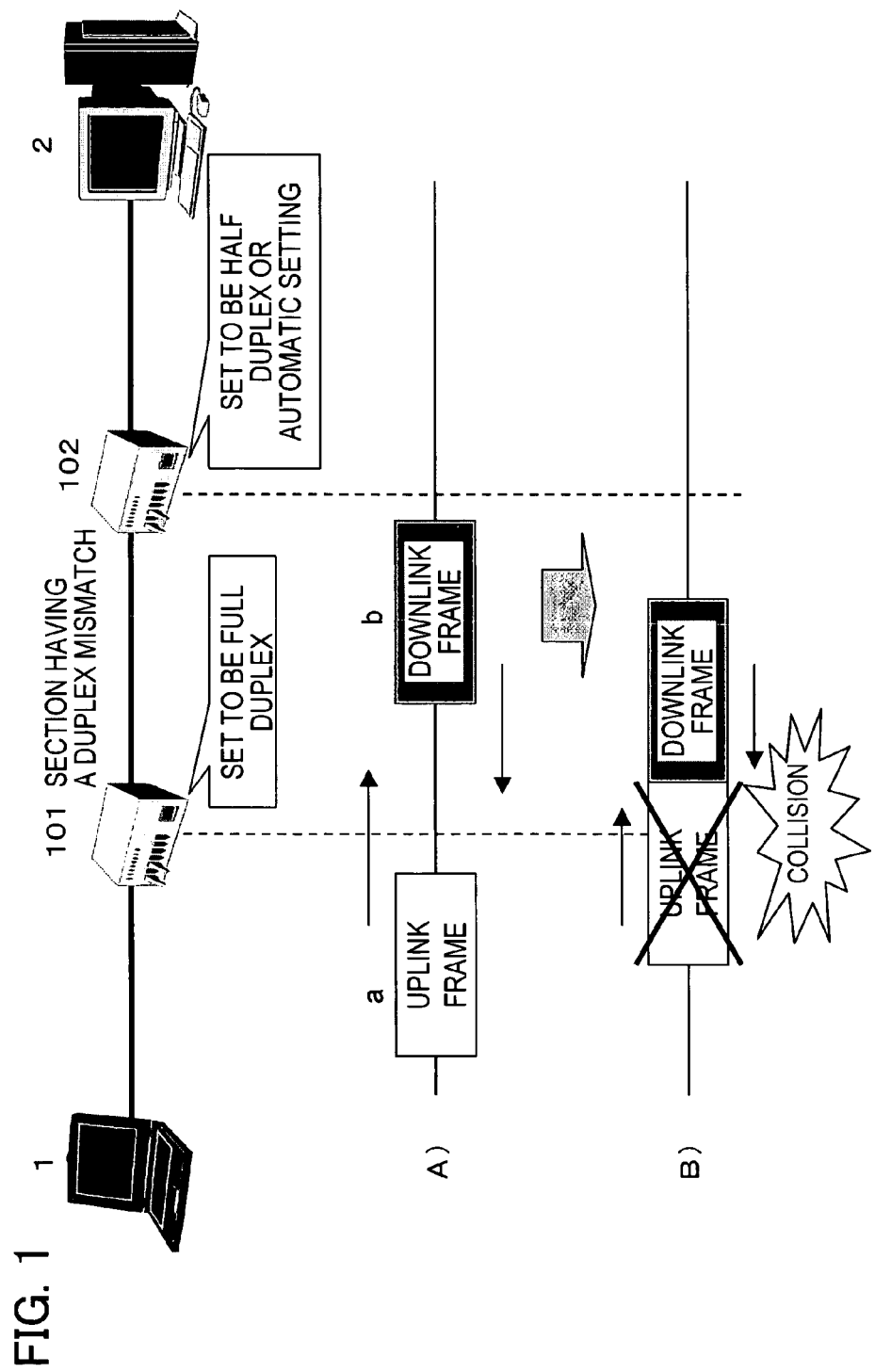
FIG. 1 is an explanatory view of packet loss caused by a duplex mismatch.

Embodiments of the invention will now be described referring to the attached drawings. However, before that, the conventional technique will be described also referring to the drawings.

FIG. 1 is an explanatory view of a packet loss caused by the duplex mismatch. Now, in FIG. 1, it is assumed that a router or a switching apparatus (hereinafter, simply referred to as "router") 101 which is a relay apparatus accommodates a client terminal 1 and a router 102 accommodates a server 2. In addition, the routers 101 and 102 are connected by an uplink line and a downlink line, and constitute a network.

In FIG. 1, assuming that the router 101 is set to be full duplex and the router 102 is set to be half duplex or automatic setting, the uplink and downlink lines connecting the routers 101 and 102 constitute a mismatch section. Therefore, as shown in the portion A) of the figure, when an uplink frame "a" traveling from the client terminal 1 to the server 2 and a downlink frame "b" traveling from the server 2 which is the apparatus to be checked to the client terminal 1 have been issued, then, as shown in the portion B) of the figure, a collision occurs in the duplex mismatch section. This case causes packet loss.

Therefore, when packet loss occurs in the communication on TCP or UDP, it is common, as described above, to check a duplex mismatch by inspecting whether the apparatuses such as a router, etc. on the communication path are set to be full duplex or half duplex. In this case, the following conditions need to be cleared.

(a) The connection topology among the network apparatuses is known.
(b) Means for checking the mode of duplex of the network apparatuses is possessed as knowledge.
(c) A human can move to a place where the human can check the duplex mode.

In addition to the above, the status of the mode of duplex needs to be actually checked manually for each of the network apparatuses and this results in a problem that the cost becomes high in terms of personnel and time.

Therefore, the invention provides a full duplex/half duplex mismatch detecting method and a full duplex/half duplex mismatch detecting apparatus applicable with the method that solve such disadvantages.

Figure 2:
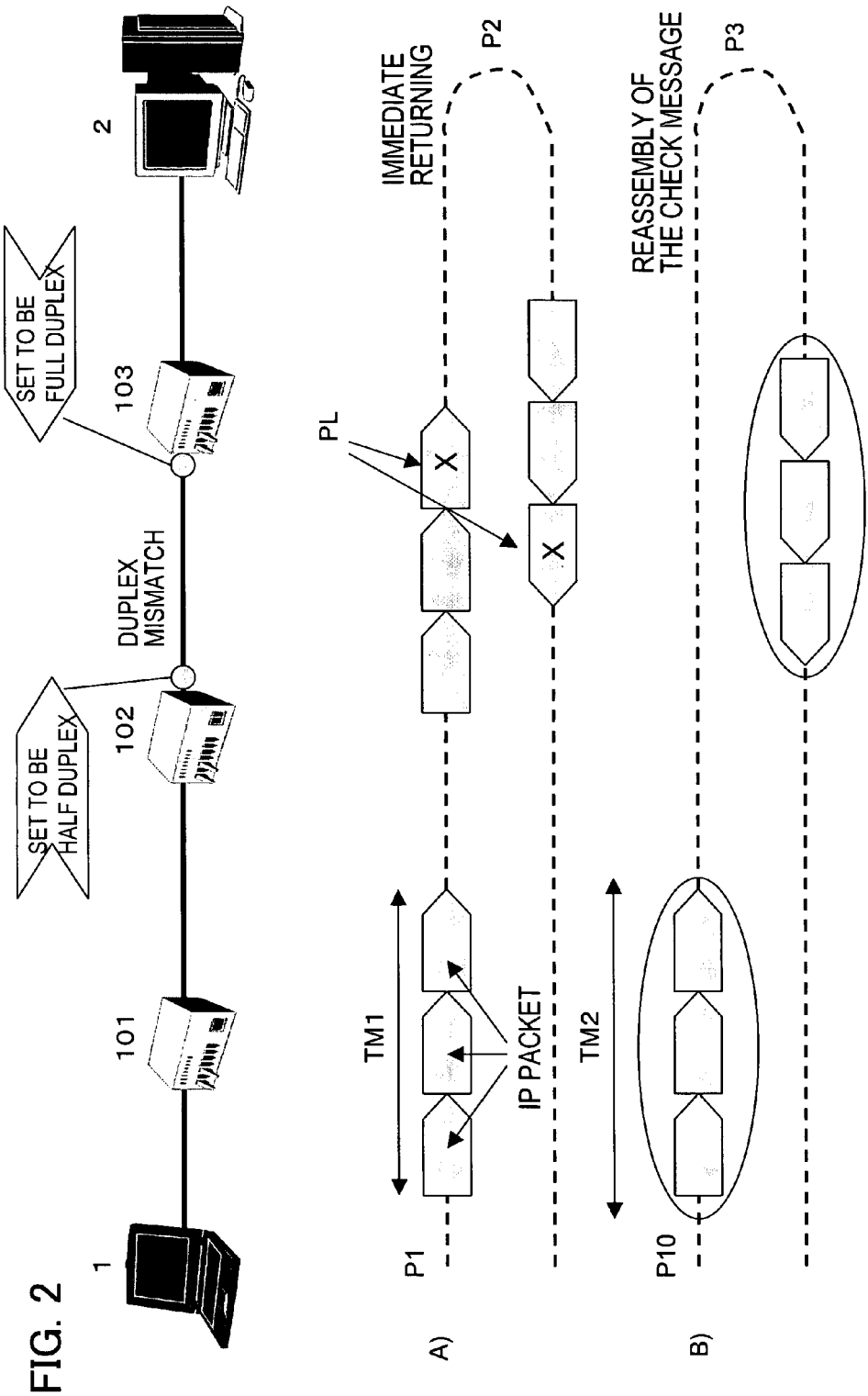
FIG. 2 is an explanatory view of an embodiment of a full duplex/half duplex mismatch detecting method according to the invention.
Figure 3:
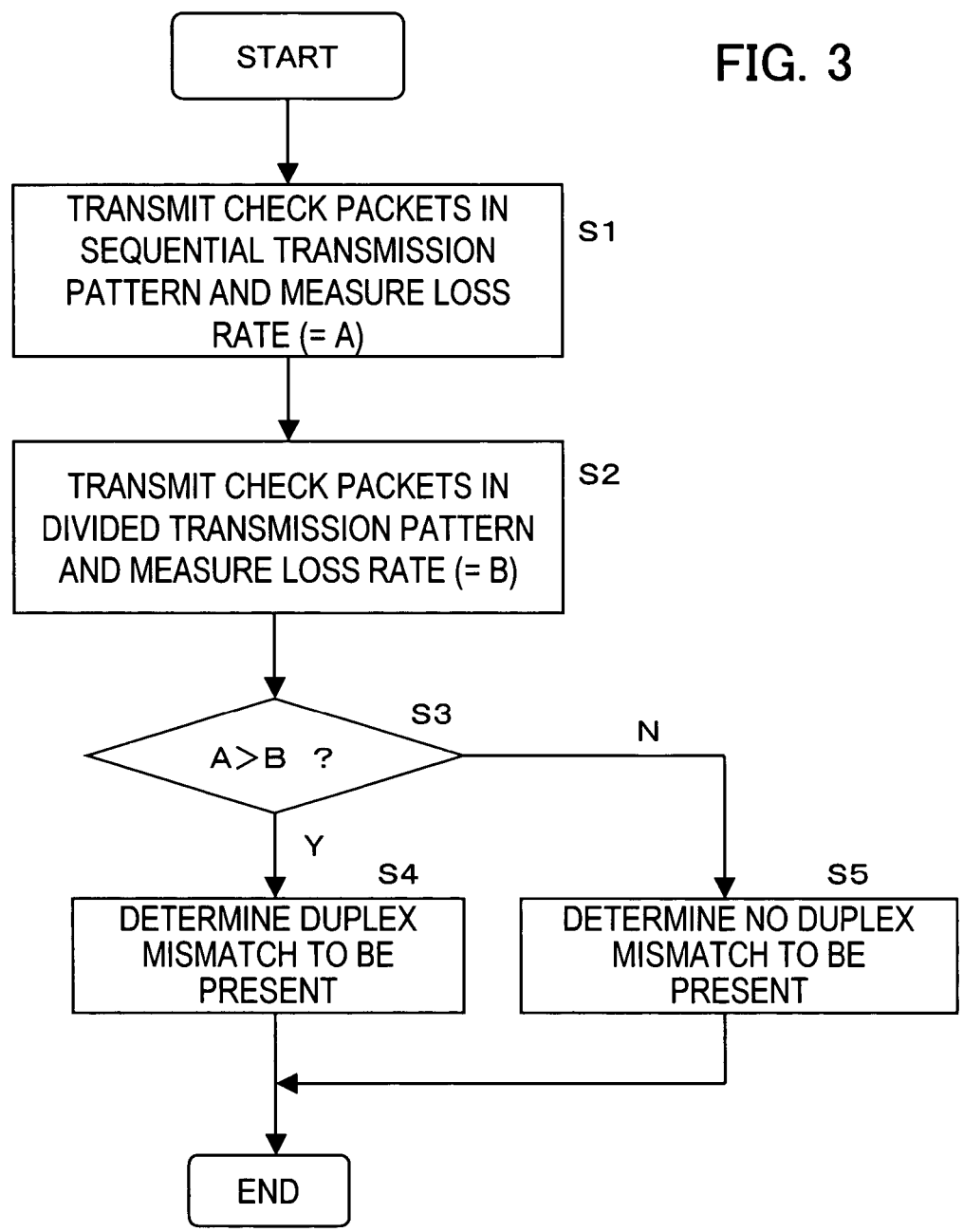
FIG. 3 is an embodiment process flow corresponding to FIG. 2.

FIG. 2 is an explanatory view of an embodiment of the full duplex/half duplex mismatch detecting method according to the invention. FIG. 3 is the embodiment process flow corresponding to FIG. 2.

In FIG. 2, routers 101, 102 103 are arranged between an apparatus to be checked 2 and a full duplex/half duplex mismatch detecting apparatus (hereinafter, referred to as "duplex detecting apparatus) 1 which detects a duplex mismatch. The router 102 is set to be half duplex and the router 103 is set to be full duplex. Then, a duplex mismatch has occurred in a section between the router 102 and the router 103.

In this embodiment, as described above, the fact is utilized, that the loss is caused to occur by a collision between an uplink packet and a downlink packet in a section with a duplex mismatch occurred. In order to do this, the duplex detecting apparatus 1 transmits check messages of approximately same amounts in two (2) patterns. That is, the messages are transmitted respectively in a pattern that will cause a collision between the uplink and downlink lines (sequential transmission pattern TM1) and in a pattern that will not cause any collision (divided transmission pattern TM2), and the loss rate for each pattern is measured (step S1, S3).

If the number of messages received is smaller than the number of messages transmitted for both patterns, loss has been caused to occur not by any duplex mismatch but by another cause such as an error on the line. When the cause is a duplex mismatch, loss occurs only to the sequential transmission pattern TM1 (=A) and any loss does not occur or loss occurs at a very low rate to the divided transmission pattern TM2 (=B).

These loss rates are compared (step S3) and, from the difference between the loss rates, the loss is determined to have been caused to occur by a duplex mismatch.

If the loss for the sequential transmission pattern (=A) is larger than the loss for the divided transmission pattern (=B) (step S3, Y), a duplex mismatch is determined to be present (step S4). Otherwise (step S3, N), no duplex mismatch is determined to be present (step S5).

That is, in FIG. 2, the portion A) shows the case of the sequential transmission pattern TM1 described above. This portion depicts that the detection messages are sequentially transmitted from the duplex detecting apparatus 1 in a pattern as the sequential transmission pattern TM1 (P1). Furthermore, when the sequential detection messages have arrived at the apparatus to be checked 2, they are returned immediately (P2). In this case, because a duplex mismatch has occurred between the routers 102 and 103, a collision between the uplink transmission and the downlink transmission of check messages occurs in this section and packet loss PL has occurred.

In contrast, the portion B) shows the case of the above divided transmission pattern. This portion depicts that a check message is divided into a plurality of packets and transmitted in a pattern as the divided transmission pattern TM2 (P10). When the check message divided into the plurality of packets has arrived at the apparatus to be checked 2, the massage is once assembled and re-transmitted (P3). Thereby, no packets are present at the same time in the section having the duplex mismatch on both of the uplink and downlink lines. Thereby, no collision occurs and no packet loss occurs.

Describing this further referring to a specific example, in the portion A) of FIG. 2, for example, even in the case of a check message for which same three (3) IP packets are transmitted and received, the check message returns a ping (a program that transmits response requests to the destination host) as a response every time the apparatus to be checked has received one (1) ping packet, for the sequential transmission pattern TM1 that sequentially transmits three (3) pings respectively of 1,500 bytes (=4,500 bytes). Therefore, the packets collide in the section having a duplex mismatch and the packet loss PL occurs (see FIG. 1).

On the other hand, in the case of the portion B) of FIG. 2, for the divided transmission pattern TM2 constituted by one (1) ping of 4,500 bytes that are fragmented into three (3) packets at the IP level, the three (3) IP packets are once assembled into one check message at the apparatus to be checked 2 and, only when the three packets have been normally received, the assembled message is fragmented again at the IP level as a response to the ping and is transmitted directed to the duplex detecting apparatus 1.

Therefore, in the case shown in the portion B) of FIG. 2, no packet loss is caused to occur in principle by a collision between the check messages because no packets pass through the uplink and downlink paths at the same time.

In this case, the apparatus to be checked 2 may be a common IP host that supports the IP fragmentation and responses to pings. In addition, when the apparatus to be checked 2 supports an especially-prescribed check message of a request/response type similar to the ping protocol, the IP fragmentation does not need to be used for the divided transmission pattern.

For example, an especially-prescribed check message other than the UDP, TCP and IP is divided and transmitted to the apparatus to be checked 2 as communication frames. Then, the apparatus to be checked 2 reconstitutes the communication frames created by the division into the check message and transmits the message. Thereby, the communication frames arrive at the detecting apparatus 1 again as a response to the check message. Therefore, a completely same checking function can be realized by returning a check message which has been divided into a plurality of communication frames.

As to the loss rate of the check message, because one (1) check message is constituted of a plurality of packets for the divided transmission pattern TM2, one (1) check message is considered to be lost even when only one (1) packet has been lost. Therefore, the loss rate for the divided transmission pattern TM2 can be obtained from the ratio of the number of check messages transmitted to that of check messages received, but from ratio of the number of packets transmitted to that of packets received.

Though the number of check messages differs between the divided transmission pattern TM2 and the sequential transmission pattern TM1, the total number of bytes of each check message is set to be approximately same as each other. This is in order to cause packet loss to occur equally in terms of probability of occurrence for both of the divided transmission and the sequential transmission under a state where packet loss in proportion to the byte count occurs.

That is, denoting the numbers of check messages for the divided transmission pattern TM2 and the sequential transmission pattern TM1 respectively as "X" and "Y", and assuming that a check message having a length of Lf [byte] is fragmented into N packets and is transmitted in the divided transmission pattern TM2, and another check message having a length of Ls [byte] is transmitted in the sequential transmission pattern TM1, X and Y are set to hold the following equation.

$$LF \times N \times X \approx Ls \times Y$$

For example, when Lf=1,500 [byte], N=10 and Ls=1,500 [byte], it is determined that X=10 and Y=100, etc.

Though the reliability of the check becomes higher as the number of check packets transmitted is increased, the check packets are transmitted within the range that does not exceed the permissible network load because the load on the network becomes too high otherwise.

The loss rate to be measured is obtained from the ratio of the number of check messages that have not been able to be received to the number of the messages transmitted. For example, in the case where Xs messages are transmitted in the divided transmission pattern TM2 and Xr check messages are received as responses, the loss rate of the check messages is obtained by (Xs−Xr)/Xs.

For the divided transmission pattern TM2, the actual packet loss rate is estimated with a value divided by the number N of packets that have been fragmented. For example, in the case where the number of messages transmitted Xs=10, the number of messages received Xr=9 and the number that packets have been fragmented into N=10, the loss rate of the check messages is 10% and each check message contains ten (10) packets respectively. If even any one of the ten packets is lost, the whole check message is considered to be lost. Therefore, considering that only one (1) packet is lost from a check message in the minimum case, the loss rate of the packets is 1/N and, thus, the loss rate of the packets can be estimated as 1%.

More precisely, any one of the following threshold values is, for example, used as the criteria for determining a duplex mismatch.

1) The loss rate for the divided transmission pattern TM2 is 0% and the loss rate for the sequential transmission pattern TM1 is 1% or more.
2) The loss rate for the divided transmission pattern TM2 is 1% or less and the loss rate for the sequential transmission pattern TM1 is 5% or more.
3) The loss rate of the sequential transmission pattern TM1 is higher than the loss rate for the divided transmission pattern TM2.

Which determination criterion should be used corresponds to a trade off between the probability of mistaken determination and the probability of failure of determination and, therefore, depends on which one of those tradeoff conditions is considered to be more important when the duplex mismatch detecting apparatus is used.

That is, being based on 1), failure of determination is minimized most but, when loss occurs for the divided transmission pattern, no duplex mismatch is determined. Being based on 3), failure of determination becomes little but the probability of mistaken determination becomes high because a duplex mismatch is determined only from the relation of magnitude even when any loss occurs for any one of the two (2) patterns. Being based on 2) results in the intermediate case between the above two (2) cases.

For example, when the check parameters are inputted, the criteria for the determination may be made variable by preparing options such as "Not overlooking any fault is important", "Determination should be performed being well balanced" and "Precision in identifying the cause is important" and by corresponding these respectively to the above 1), 2) and 3).

Because any of the determination criteria as described above shows that loss is caused to occur by a collision, a duplex mismatch can be determined consequently. This determination of the duplex mismatch may be performed not only once but several times. The detection precision can be improved by, for example, setting separately other determination criteria such as "A duplex mismatch is determined with the probability of b/a when the determination is performed for "a" times and a duplex mismatch is determined for b times."

In addition, the interval T [sec] between performance may be determined and determination may be repeated for a total of N times for every T. Though the reliability of determination becomes higher as the number of times N of performance becomes larger, the load on the network also becomes larger. Therefore, it is practical to determine the largest N within the permissible range per unit time. The performance interval T and the number of times N do not need to be constant amounts and may be varied dynamically in response to the state of the load on the network.

For example, N may be dynamically varied in response to the time span, the network utilization rate and the terminal utilization rate such as, for example, setting N to be a large number such as 100 or more when the check is performed during a time span such as the night time during which the network is not crowded, and setting N to be a small number such as 10 or less for performing during the daytime. The utilization rates of the network and the terminal may be obtained from a system operation control apparatus that uses a management protocol such as the SNMP (Simple Network Management Protocol), etc. or the duplex mismatch detection apparatus 1 may obtain the rates directly using the network apparatuses, terminals and the management protocol.

For example, the time of day for a check, the number of times of checks and the interval between the checks suitable in view of utilization rate of the network and the utilization rate of the terminals for each destination to be checked may be provided in advance as the check parameters, and the detecting apparatus 1 can perform the detection according to a given schedule.

It can also be considered that the precision of detecting a duplex mismatch can be further improved by repeating the check varying the combination of the check interval T and the number of times N for checking and performing checks varying the parameters dynamically such that the combination of T and N for which loss occurs most for the sequential transmission pattern is obtained.

This is because the duplex mismatch can be more easily detected as loss becomes more for the sequential transmission pattern TM1 because this embodiment is based on the principle that a duplex mismatch is detected from the difference in the loss rate between the sequential transmission pattern and the divided transmission pattern TM2.

On the other hand, when loss is caused to occur by a bit error on a line or a fault of a NIC (Network Interface Card) or a router, the total amount of traffic and the number of the times of loss are often proportional. Furthermore, when no loss has occurred for both of the sequential transmission pattern TM1 and the divided transmission pattern TM2, no duplex mismatch is similarly estimated to be present.

Even any one (1) of the packets has been lost, this corresponds to loss of the whole ping and large loss occurs. When the line loss rate is α and the number of fragments is N, the loss rate is $1-(1-\alpha)^N$. For example, even when the loss rate is 2%, the probability of loss of a check message itself becomes higher to approximately 18% if the number of fragments is ten (10). From this, measurement of the loss rate of a fragment ping is very effective for bracketing with line loss, etc.

As the check packets to be transmitted sequentially, it is preferable to use packets of approximately 1,500 byte each that have higher possibility of colliding in the duplex mismatch section and can be easily transmitted sequentially by the low performance duplex detecting apparatus 1 or the apparatus to be checked 2, in order for loss to be caused to occur as easily as possible by a duplex mismatch. However, the check packets does not need to be long packets because short packets may collide when they are transmitted sequentially.

In addition, though ping packets that are commonly used for checking the canalization for IP networks are used in this embodiment, the packets are not limited to the ping packets and any packets may be used such as using other types of IP packets and non-IP packets such as IPX (Internet Protocol exchange), SNA (Systems Network Architecture) etc.

In order to detect a mismatch near the duplex detecting apparatus 1, the packets need to be transmitted from the duplex detecting apparatus 1 at the timing at which the response packets return from the apparatus to be checked. In order to realize this, ping transmission needs to be performed at approximately RTT (Round Trip Time: Round-trip delay) intervals. In order to obtain the RTT, the round-trip delay from the transmitting-side terminal (the duplex detecting apparatus 1) to the receiving-side terminal (the apparatus to be checked 2) can be obtained by using a protocol such as, for example, "ping".

In contrast, in order to detect a mismatch near the receiving-side terminal, a transmitted packet from the transmitting side needs to arrive at the probing target at the timing at which the response packet from the probing target returns. In order to realize this, check messages need to be transmitted sequentially.

Figure 4:
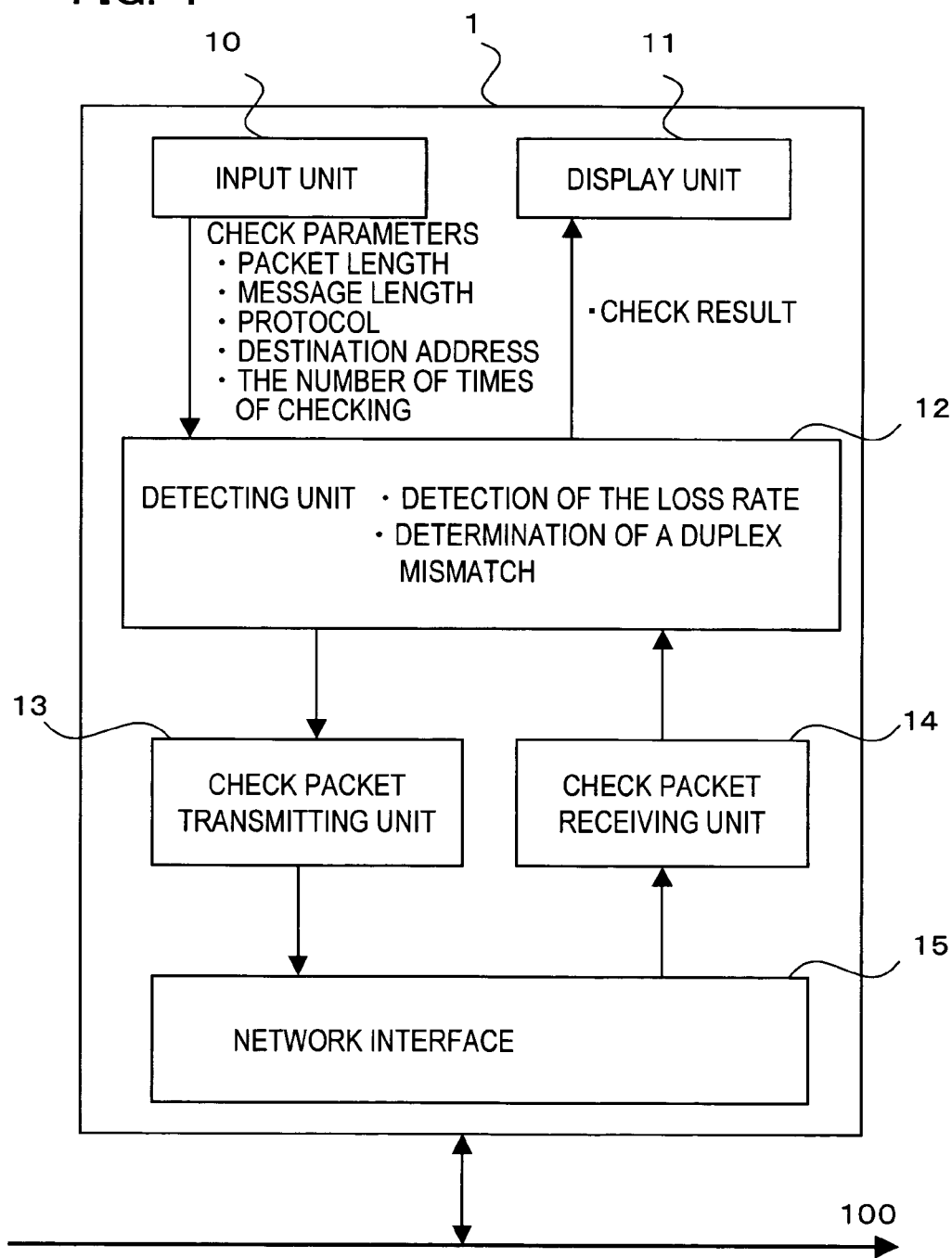
FIG. 4 is an exemplary block diagram of the configuration of the duplex detecting apparatus 1 applicable with the method of the invention.

FIG. 4 is an exemplary block diagram of the configuration of the duplex detecting apparatus 1 applicable with the method of the invention. Detection parameters capable of being customized can be provided from an input unit 10 and parameters having been set as default may also be used.

A detection result that has been determined at a detection unit 12 is displayed on a display unit 11 as the detection result.

The detection unit 12 orders a check packet transmitting unit 13 to transmit check packets based on the check parameters from the input unit 10 as well as calculates the loss rate by comparing the number of packets transmitted and the number of packets received, and the function for determining a duplex mismatch is realized by that pattern.

The check packet transmitting unit 13 creates check messages and check packets, and transmits these packets through a network interface 15 to a network 100 according to a method directed by the detection unit 12. A check packet receiving unit 14 receives only the packets used for a check, extracting these packets from the packets received by the network interface 15, and notifies the detection unit 12 of information of the received packets.

The check parameters (packet length, message length, protocol, address, the number of times of checking) as shown in FIG. 4 are only examples and additional information such as, for example, checking time interval, and an identification symbol ID for easily identifying the check packets and distinguishing them from other types of packets, may be inputted.

Figure 5:
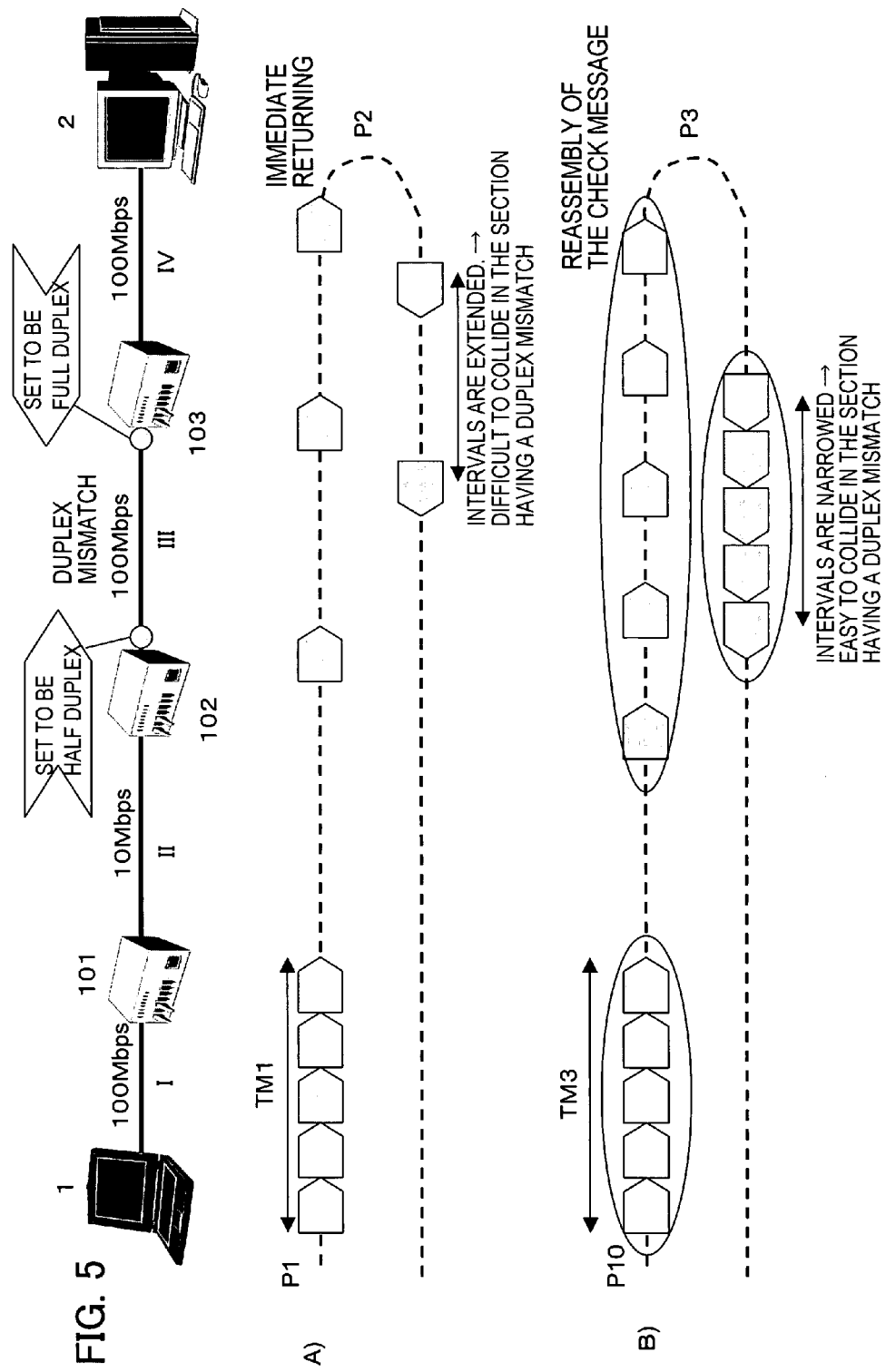
FIG. 5 is an explanatory view of a method of a second embodiment.
Figure 6:
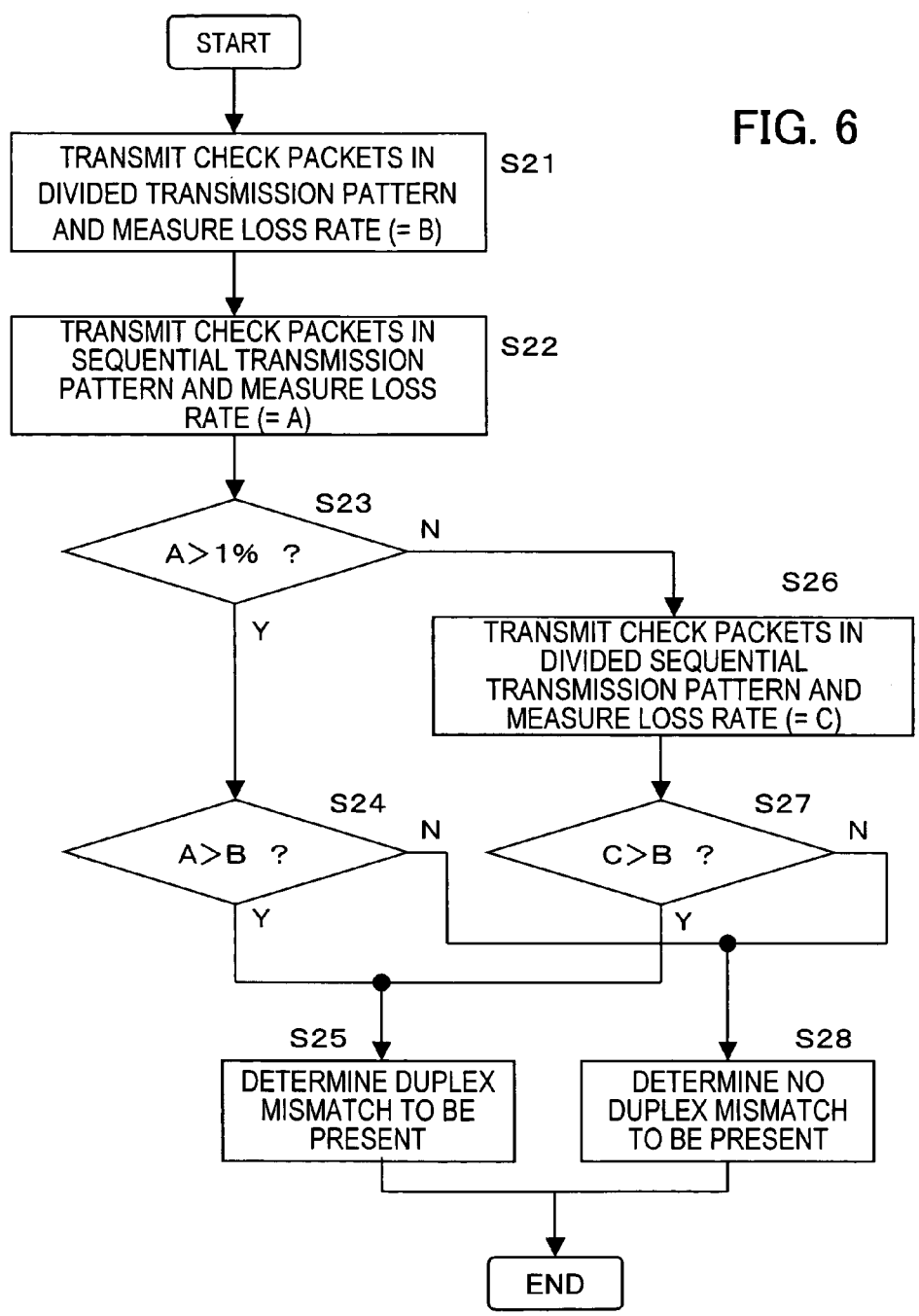
FIG. 6 is a process flowchart corresponding to the embodiment of FIG. 5.

Next, a second embodiment according to the invention will be described. FIG. 5 is an explanatory view of a method of the second embodiment and FIG. 6 is a process flowchart corresponding to FIG. 5. In this second embodiment, a divided sequential transmission pattern TM3 is further added. This is an embodiment that detects a duplex mismatch by transmitting and receiving the following three types of check packets.

The third divided sequential transmission pattern TM3 is a pattern representing that divided check messages are transmitted sequentially putting no intervals between them. The pattern TM3 differs from the divided transmission pattern TM2 in the previous embodiment by the point that the pattern TM3 puts no intervals, and differs from the sequential transmission pattern TM1 by the point that the check messages are divided in the pattern TM3.

1) Sequential transmission pattern TM1
2) Divided transmission pattern TM2
3) Divided sequential transmission pattern TM3

By adding further the divided sequential transmission pattern TM3, an effect can be obtained, that, for example, a remote duplex mismatch through a WAN line at a slower speed compared to a LAN line, can be more easily discovered.

A network of FIG. 5 has a network configuration that has a LAN line (I) of 100 Mbps and a WAN line (II) of 10 Mbps and has a duplex mismatch in a LAN line (III) of 100 Mbps through (I) and (II). In the case where the duplex mismatch is searched from the LAN line (I), for the sequential transmission pattern TM1 as shown in the portion A) of the figure, each of the intervals between the check packets is extended by a factor of ten (10) when the packets pass through the 10 Mpbs section of the LAN line (I), and the packets are returned with the intervals kept extended. Therefore, on the LAN line (III), the probability of collision is significantly decreased because the packets pass on its uplink and downlink lines with the intervals kept extended.

In order to suppress this, the packet intervals once extended may be narrowed again to the intervals that are same as that of the time when the packets were transmitted. As a method to realize this, the divided sequential transmission pattern TM3 is used. That is, for the divided sequential transmission pattern TM3, the probability of a collision between check messages in the section having a duplex mismatch (LAN line (III)) is increased and the loss rate is increased by transmitting sequentially divided check massages. Thereby, even when no loss has occurred (or the loss rate is significantly low) for the sequential transmission pattern TM1 and the divided transmission pattern TM2, a duplex mismatch can be determined.

As a specific embodiment, any one of the following threshold is used, for example, as a criterion to determine a duplex mismatch.

1) The loss rate for the divided transmission pattern TM2 is 0% and the loss rate for the divided sequential transmission pattern TM3 is 1% or more.
2) The loss rate for the divided transmission pattern TM2 is 1% or less and the loss rate for the divided sequential transmission pattern TM3 is 5% or more.
3) The loss rate of the divided sequential transmission pattern TM3 is higher than the loss rate for the divided transmission pattern TM2.

Which determination criterion should be used is same as that of the previous embodiment and corresponds to a tradeoff between the probability of mistaken determination and the probability of failure in determination and, therefore, depends on which one of those tradeoff conditions is considered to be more important when this method of the invention is used.

When the divided sequential transmission pattern TM3 is used, the pattern may be caused to decrease the load on the network by using the pattern such that, for example, the pattern is used for the check as a third pattern when the loss rate is equal to or less than a predetermined threshold of, for example, 1%, or the three (3) patterns may be always used.

Figure 7:
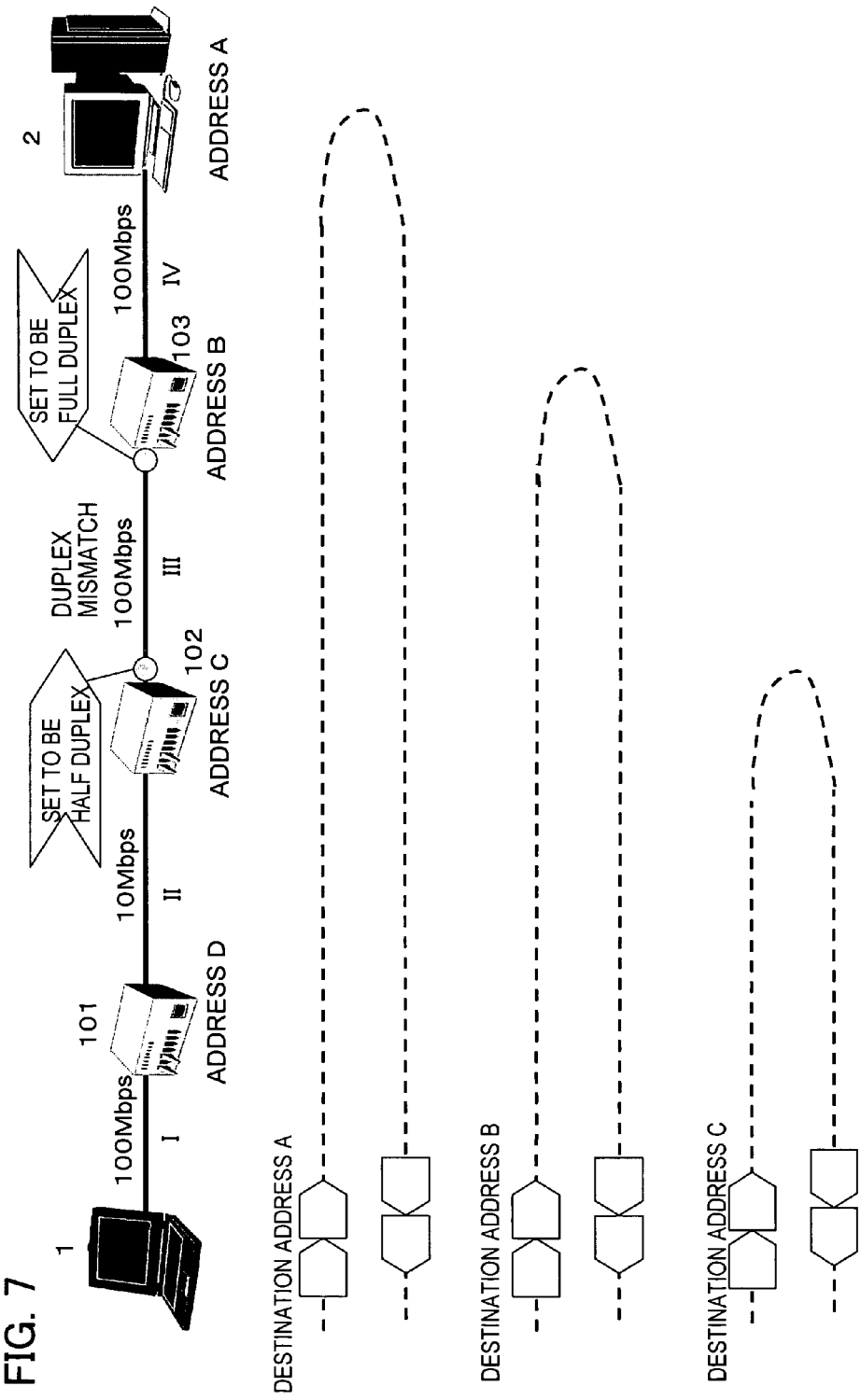
FIG. 7 shows a network to explain an embodiment that locates the position of a duplex mismatch.
Figure 8:
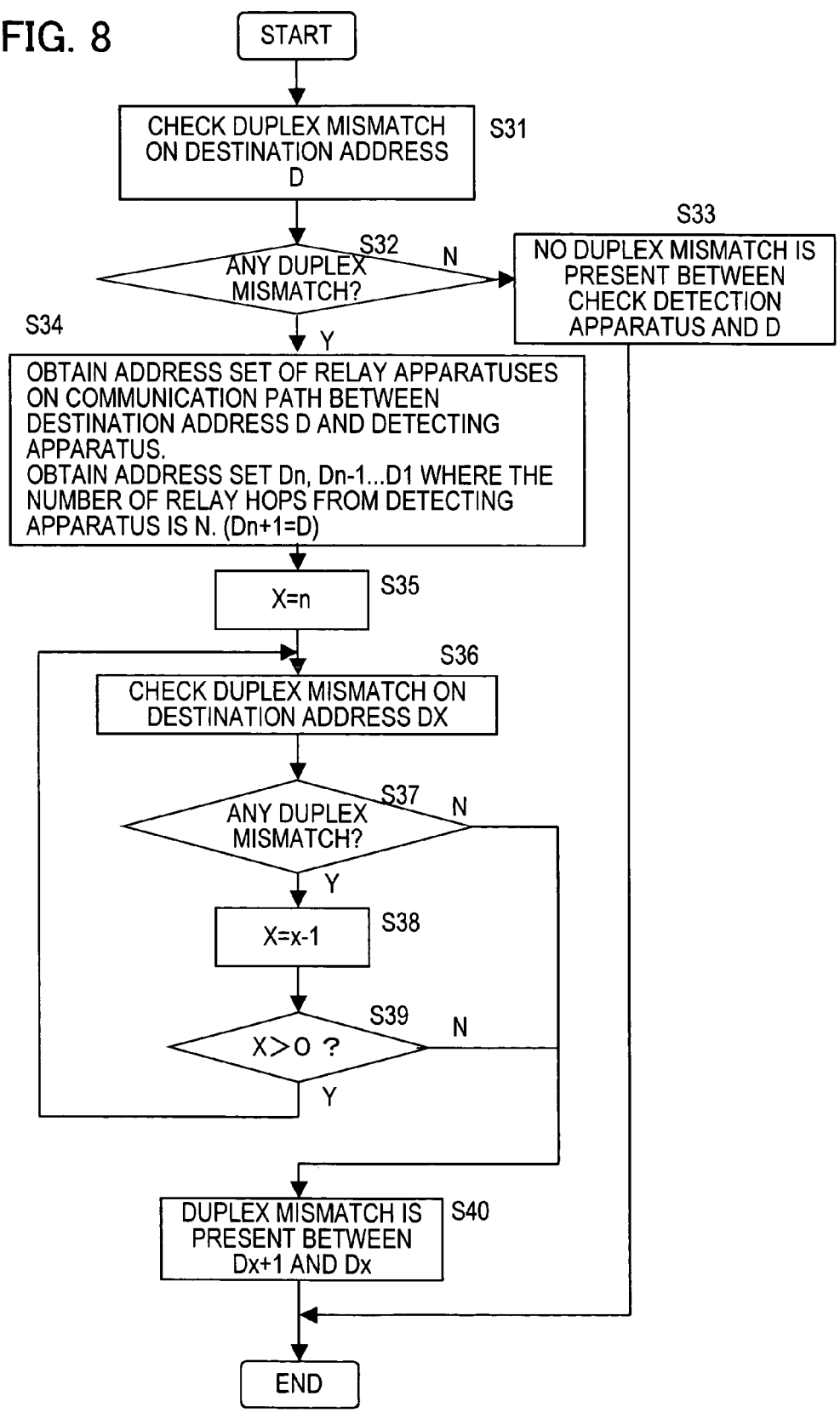
FIG. 8 is a check flowchart corresponding to the embodiment of FIG. 7.

Here, in the case where a duplex mismatch is present at a position on the path between the apparatus to be checked 2 and the duplex detection apparatus 1, the position of the duplex mismatch can be located further in the following method. As an example, a network shown in FIG. 7 is assumed and the routers 101, 102, 103 having respectively an address "B", "C", "D" are assumed to be present on a communication path between the apparatus to be checked (address "A") and the duplex detecting apparatus 1. FIG. 8 is a check flowchart corresponding to the example of FIG. 7.

Here, a duplex mismatch is assumed to be present between the addresses B and C. Now, it is assumed that the duplex detecting apparatus 1 performs a check of a duplex mismatch on the apparatus to be checked 2 (address A) (step S31) and detects the duplex mismatch (step S32, Y). At the step S32, if no duplex mismatch is present between the maximum hop number, no duplex mismatch can be determined between the duplex detecting apparatus 1 and the apparatus to be checked (step S33).

If a duplex mismatch is detected in the above step S32 (step S32, Y), though it can be discovered that a duplex mismatch is present somewhere on the path between the apparatus to be checked 2 and the duplex detecting apparatus 1 at this time, the position can not be located.

Then, the addresses of the switch or routers B, C, D on the path are obtained using an approach such as, for example, "traceroute", that identifies a router on a path or using an approach that identifies a relay apparatus on a path from the network topology and routing information obtained in advance (step S34). Based on this, a duplex mismatch is checked one after another from a relay apparatus with a larger number of hops or a smaller number of hops viewed from the duplex detecting apparatus 1 (steps S35 to S39).

In this embodiment, a duplex mismatch is checked one after another from an apparatus with a larger number of hops, that is, in order of the addresses B, C, D. Here, it can be discovered that a duplex mismatch has occurred between the addresses B and C from the fact that a mismatch has been discovered by a check on the address B and no mismatch has been discovered by a check on the address C.

In this case, because it is obvious that no duplex mismatch is detected by a check on the address D, no check is performed on the address D. In the above example, the duplex mismatch detecting check needs to be performed not only once but it may be repeated a plurality of times and the mode of their determination results may be located as the position. When the dispersion of the results is large, the position can be determined to be impossible to locate.

In addition, as another embodiment of the invention, an example of the case where a plurality of duplex detecting apparatuses are used for detection will be described. It is assumed that, as shown in FIG. 9, two (2) duplex detecting apparatuses 1, 3 respectively perform a check of a duplex mismatch on the apparatus to be checked 2 and, as a result, the duplex detecting apparatus 1 detects a duplex mismatch and the duplex detecting apparatus 3 detects no duplex mismatch.

The check message path from the duplex detecting apparatus 1 to the apparatus to be checked 2 and the check message path from the duplex detecting apparatus 3 to the apparatus to be checked 2 are shared according to the connection relation between the duplex detecting apparatuses 1,3 and the apparatus to be checked 2. However, no duplex mismatch is detected by the check on the path from the duplex detecting apparatus 3 to the apparatus to be checked 2. From this fact, it can be estimated that no duplex mismatch is present on the shared path. From the above, the location at which the duplex mismatch has occurred can be located to be between the duplex detecting apparatus 1 and the router 101.

The connection relation between the duplex detecting apparatuses 1,3 and the apparatus to be checked 2 may be dynamically discovered using a existing path locating approach such as the "traceroute" or may be provided in advance.

As described above referring to the embodiments of the invention, a duplex mismatch can be easily detected according to the invention and the position of the duplex mismatch can also be located.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An apparatus, comprising:
a transmitting unit configured to transmit a first group of data units, which is a sequential transmission pattern, and a second group of data units having the same message length of the first group of data units, which is a divided transmission pattern to another apparatus, wherein each data unit of said first group includes a request message for a response, and data units of said second group include divided messages,
wherein the sequential transmission pattern is a pattern that will cause a collision between uplink and downlink lines and the divided transmission pattern is a pattern that will not cause a collision;
a receiving unit configured to receive response messages, each of which is returned by said another apparatus in response to detecting at the another apparatus, said request message of said each data unit of said first group, and to receive divided response messages that are returned by said another apparatus in response to a detection of a message obtained by assembling the divided messages at the another apparatus; and
a judging unit configured to judge that when a loss rate of the response messages received at said apparatus from said first group is smaller than a loss rate of the divided response messages received from said another apparatus, a full duplex/half duplex mismatch is determined as present on a network path between the apparatus and the another apparatus.

2. A method of detecting a full duplex/half duplex mismatch by an apparatus connected through a network path to another apparatus, the method comprising:
transmitting from the apparatus a first group of data units, which is a sequential transmission pattern, of which each data unit includes a request message for a response, and a second group of data units having the same message length of the first group of data units, which is a divided-transmission pattern, to the another apparatus, wherein the sequential transmission pattern is a pattern that will cause a collision between uplink and downlink lines and the divided transmission pattern is a pattern that will not cause a collision;
receiving response messages, each of which is returned by the another apparatus in response to detecting the request message of said each data unit of the first group, and receiving divided response messages that are returned from the another apparatus in response to a detection of a message obtained by reassembling the divided messages at the another apparatus; and
judging at the apparatus that when a loss rate of the response messages received from the first group at said apparatus is smaller than a loss rate of the divided response messages received from said another apparatus, the full duplex/half duplex mismatch is determined as present on the network path between the apparatus and the another apparatus.

3. The method of detecting full duplex/half duplex mismatches according to claim 2, wherein transmission of the first group of data units and the second group of data units is repeated for a plurality of times.

4. The method of detecting full duplex/half duplex mismatches according to claim 2, wherein a time period during which or a time at which the first group of data units and the second group of data units are transmitted is controlled such that a load on the network path does not exceed a predetermined level.

5. The method of detecting full duplex/half duplex mismatches according to claim 2, wherein a round-trip delay time between the apparatus and the another apparatus is measured in advance, and intervals for transmitting the first group of data units and the second group of data units are controlled such that each interval is equal to the measured round-trip delay time.

6. The method of detecting full duplex/half duplex mismatches according to claim 2, wherein the apparatus is a full duplex/half duplex mismatch detecting apparatus and the another apparatus is a host, wherein a plurality of nodes are present on the network path between the full duplex/half duplex mismatch detecting apparatus and the host, and wherein
returning of the response messages and the divided response messages is performed one after another at the host and the plurality of nodes and a position of a presence of the full duplex/half duplex mismatch is determined.

7. The method of detecting full duplex/half duplex mismatches according to claim 6, wherein the detection of the full duplex/half duplex mismatch is performed by two (2) full duplex/half duplex mismatch detecting apparatuses connected with one (1) node among the plurality of nodes and, wherein
when presence of no full duplex/half duplex mismatch has been determined in a section shared by paths of the first group of data units and the second group of data units, presence of a full duplex/half duplex mismatch is determined on the path connecting the one node with any one (1) of the two (2) full duplex/half duplex mismatch detecting apparatuses.

8. A full duplex/half duplex mismatch detecting system for detecting a full duplex/half duplex mismatch of a network path, comprising:
a duplex/half duplex mismatch detecting apparatus to detect the full duplex/half duplex mismatch; and
a host connected to the duplex/half duplex mismatch detecting apparatus through the network path, wherein
the duplex/half duplex mismatch detecting apparatus comprises:
a transmitting unit configured to transmit a first group of data units, which is a sequential transmission pattern, and a second group of data units having the same message length of the first group of data units, which is a divided transmission pattern to the host,
wherein the sequential transmission pattern is a pattern that will cause a collision between uplink and downlink lines and the divided transmission pattern is a pattern that will not cause a collision;
wherein each data unit of said first group includes a request message for a response, and the data units of said second group include divided messages;
a receiving unit configured to receive response messages, each of which is returned by said host in response to detecting said request message of said each data unit of said first group, and to receive divided response messages that are returned by said host in response to a detection of a message obtained by assembling said divided messages at the host;
a judging unit configured to judge that when a loss rate of the response messages received from said first group at the duplex/half duplex mismatch detecting apparatus is smaller than a loss rate of the divided response messages received from the host, the full duplex/half duplex mismatch is determined as present on the network path between the duplex/half duplex mismatch detecting apparatus and the host.

9. The full duplex/half duplex mismatch detecting system according to claim 8, wherein the full duplex/half duplex mismatch detecting apparatus repeats transmission of the first group of data units and the second group of data units for a plurality of times.

10. The full duplex/half duplex mismatch detecting system according to claim 8, wherein the detecting apparatus controls a time period during which or a time at which the check packets the first group of data units and the second group of data units are transmitted such that a load on the network path does not exceed a predetermined level.

11. The full duplex/half duplex mismatch detecting system according to claim 8, wherein a round-trip delay time between the full duplex/half duplex mismatch detecting apparatus and the host is measured in advance, and the detecting apparatus controls intervals for transmitting the first group of data units and the second group of data units such that each interval is equal to the measured round-trip delay time.

12. The full duplex/half duplex mismatch detecting system according to claim 8, further comprising:
a plurality of nodes on the network between the full duplex/half duplex mismatch detecting apparatus and the host, wherein
returning of the response messages and the divided response messages one after another at the host and the plurality of nodes, and the detecting apparatus and determines a position of a presence of the full duplex/half duplex mismatch.

13. The full duplex/half duplex mismatch detecting system according to claim 12, wherein the detection of the full duplex/half duplex mismatch is performed by two (2) full duplex/half duplex mismatch detecting apparatuses connected with one (1) node among the plurality of nodes and, when presence of no full duplex/half duplex mismatch has been determined in a section shared by paths of the first group of data units and the second group of data units, presence of a full duplex/half duplex mismatch is checked on the path connecting the one node with any one (1) of the two (2) full duplex/half duplex mismatch detecting apparatuses.

* * * * *